United States Patent
Sakaida

Patent Number: 6,109,569
Date of Patent: Aug. 29, 2000

[54] HOSE HOLDER SYSTEM

[75] Inventor: Kenichi Sakaida, Aichi, Japan

[73] Assignee: Toyota Yuki Co., Ltd., Aichi, Japan

[21] Appl. No.: 08/734,875

[22] Filed: Oct. 22, 1996

[30] Foreign Application Priority Data

Jun. 25, 1996 [JP] Japan ............................ 8-184071

[51] Int. Cl.[7] ................................................ A62C 13/76
[52] U.S. Cl. ........................... 248/75; 248/62; 248/74.2; 248/316.7
[58] Field of Search ........................ 248/74.2, 62, 75, 248/91, 316.1, 316.7, 77, 78, 79; 24/335, 338, 339

[56] References Cited

U.S. PATENT DOCUMENTS

| | | | |
|---|---|---|---|
| 1,906,874 | 5/1933 | Platt | 248/316.7 |
| 3,313,009 | 4/1967 | Beckerer | 248/74.2 |
| 4,119,285 | 10/1978 | Bisping | 248/74.2 |
| 4,306,697 | 12/1981 | Mathews | 248/74.2 |
| 4,999,885 | 3/1991 | Lee | 24/578 |
| 5,085,384 | 2/1992 | Kasubke | 248/74.2 |

*Primary Examiner*—Leslie A. Braun
*Assistant Examiner*—Gwendolyn Baxter
*Attorney, Agent, or Firm*—Browdy and Neimark

[57] ABSTRACT

A hose holder system comprises at least one hose holder provided with a base portion and a hose holding portion for holding a hose therein. The system is characterized in that: the hose holding portion is integrally formed with the base portion; and, the base portion has one of its opposite end portions formed into a socket and the other of the opposite end portions formed into a plug sized to be fitted in the socket. In the system, a plurality of the hose holders are detachably connected with each other to form such as a linear construction and annular constructions.

17 Claims, 7 Drawing Sheets

HOSE HOLDER SYSTEM

BACKGROUND OF THE INVENTION

1. Field of the Invention

The present invention relates to a hose holder system, and more particularly to a hose holder system for holding, in neat and orderly arrangements, elongated members such as: hoses for use in hydraulic lines, pneumatic lines, and lubricating lines; electric wires such as ones called the "Nipporex tubes" (trade name); tubes; pipes; and, like elongated members, whereby these elongated members, each of which is hereinafter referred to as a general term "hose", are prevented from being entangled with each other in arrangements.

2. Description of the Prior Art

Many hydraulic and pneumatic instruments are used in mother machines (i.e., machine tools), construction machines, internal combustion engines, and like machines. These instruments are provided with a plurality of hydraulic and pneumatic hoses which are often disorderly arranged therein. Heretofore, however, since there is no simple system designed to hold such hoses in neat and orderly arrangements, adjacent ones of these hoses often interfere with each other due to vibration caused by these machines. Such interference, i.e., rubbing of the adjacent hoses may cause hose breakage or hose puncture resulting in oil and air leakage.

SUMMARY OF THE INVENTION

Under such circumstances, the present invention was made. Therefore, it is an object of the present invention to provide a hose holder system, in which a plurality of hose holders may detachably snap on each other, even when they vary in size to hold a plurality of different-size hoses of hydraulic and pneumatic instruments in neat and orderly arrangements, to prevent these hoses from interfering with each other or with frames of the instruments, thereby solving hose troubles such as oil and air leakage, progressive wear and the like.

It is another object of the present invention to provide a hose holder system simple in construction and low in manufacturing cost, in which system a desired number of the hose holders may detachably snap on each other and be easily disposed in a position in which the hoses are brought into contact with wall surfaces, floor, frames of hydraulic and pneumatic instruments, and like objects, so that a desired number of the hoses are held in neat and orderly arrangements without fear of any hose trouble.

Further another objects, features and advantages of the present invention will appear more fully from the following description.

According to a first aspect of the present invention, the above objects of the present invention are accomplished by providing:

A hose holder system comprising at least one hose holder provided with a base portion and a hose holding portion for holding a hose therein, characterized in that:
  the hose holding portion is integrally formed with the base portion and provided with an opening for receiving the hose therein; and
  the base portion has one of its opposite end portions formed into a socket means and the other of the opposite end portions formed into a plug means sized to be fitted in the socket means.

According to a second aspect of the present invention, the above objects of the present invention are accomplished by providing:

The hose holder system, as set forth in the first aspect of the present invention, wherein:
  the hose holder system comprises at least a pair of the hose holders;
  the hose holding portion of the hose holder is provided with a neck portion through which the hose holding portion is integrally connected with the base portion;
  the socket means is provided with a cut-off intermediate portion which is larger in width than the neck portion; and
  the plug means of one of the hose holders is rotatably mounted in the socket means of the other of the hose holders.

According to a third aspect of the present invention, the above objects of the present invention are accomplished by providing:

The hose holder system, as set forth in the second aspect of the present invention, wherein:
  the hose holders are different in diameter of the opening of the hose holding portion from each other, while connected with each other.

According to a fourth aspect of the present invention, the above objects of the present invention are accomplished by providing:

The hose holder system, as set forth in any one of the above aspects of the present invention, wherein:
  the hose holder is provided with a through-hole passing through an inner bottom surface of the hose holding portion and the base portion, the through-hole serving as a mounting hole of the hose holder.

According to a fifth aspect of the present invention, the above objects of the present invention are accomplished by providing:

The hose holder system, as set forth in any one of the above aspects of the present invention, wherein:
  the hose holder is provided with a pair of projections in opposite sides of the base portion; and
  the projections engage with a support rail fixed to instruments, wall surfaces and like supports.

DESCRIPTION OF THE PREFERRED EMBODIMENTS

Hereinbelow, the present invention will be described in detail with reference to the accompanying drawings.

Figure 1:
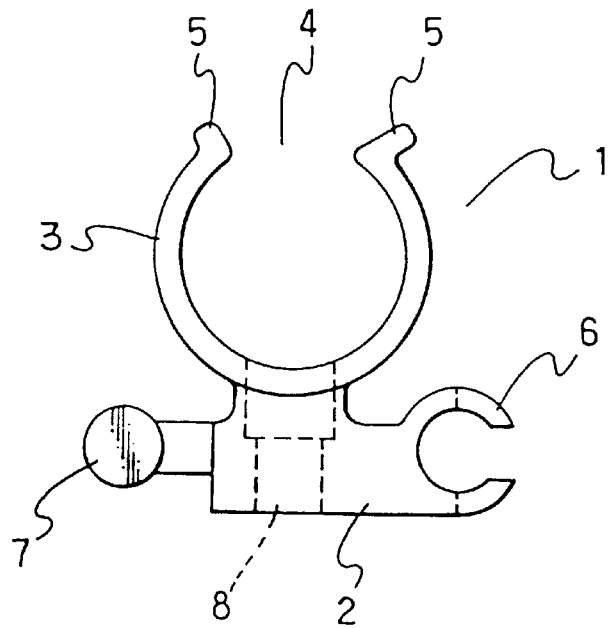
FIG. 1 is a front view of a first embodiment of the hose holder of the present invention.
Figure 3:
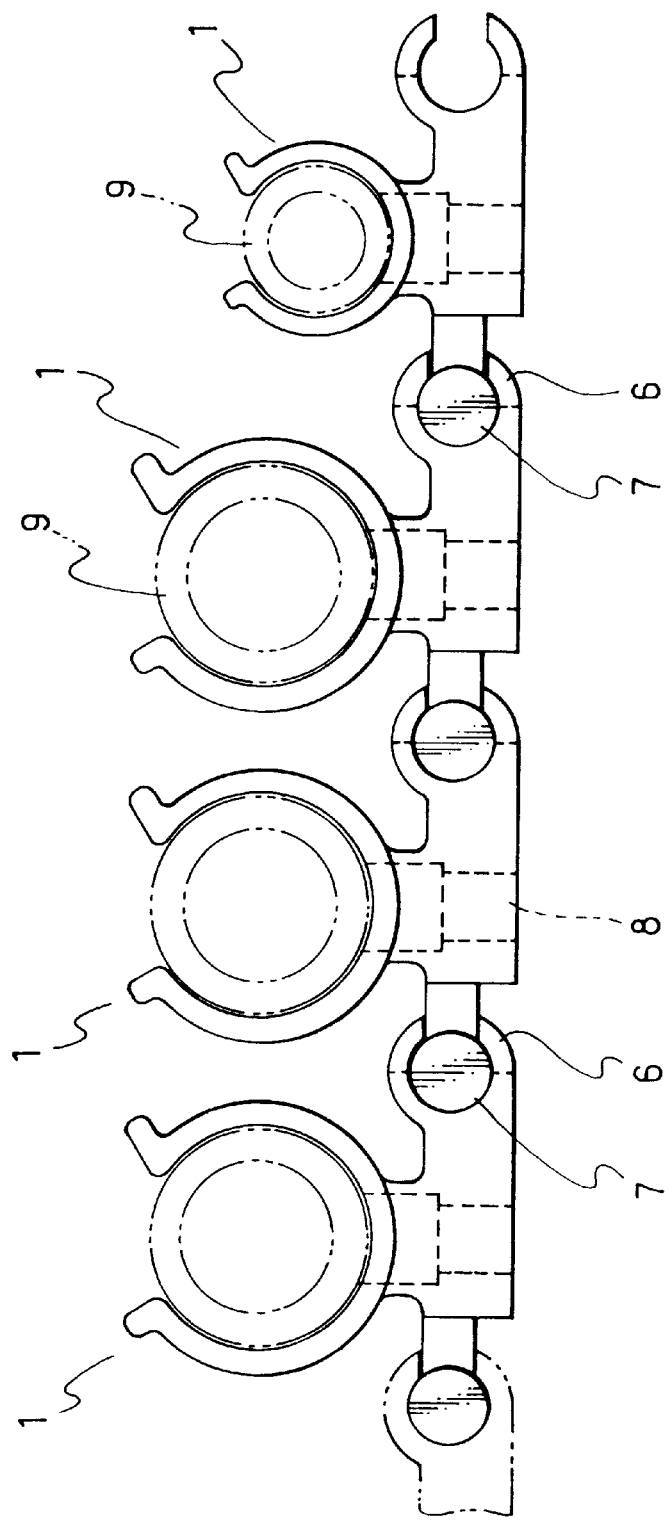
FIG. 3 is a front view of the hose holder system of the present invention, in which system a plurality of different-size hose holders are detachably connected with each other.
Figure 4C:
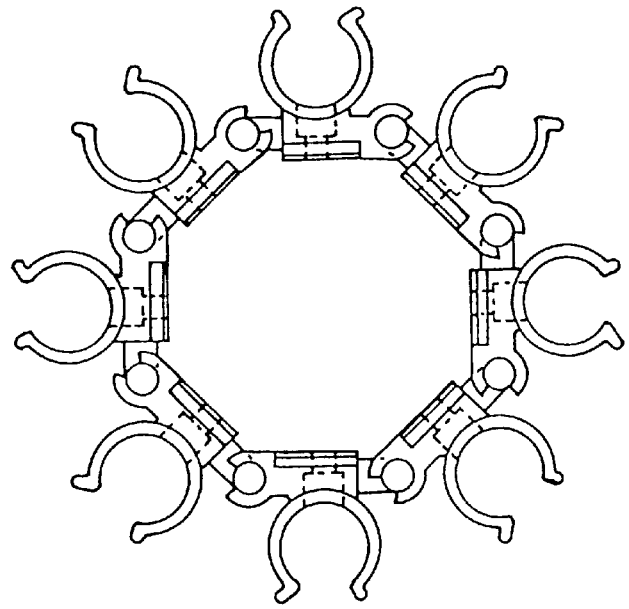
FIGS. 4(A), 4(B), 4(C), 4(D), 4(E) and 4(F) are front views of various constructions of the hose holder system of the present invention, in which system a plurality of the hose holders are detachably connected with each other and formed into such various constructions.
Figure 4B:
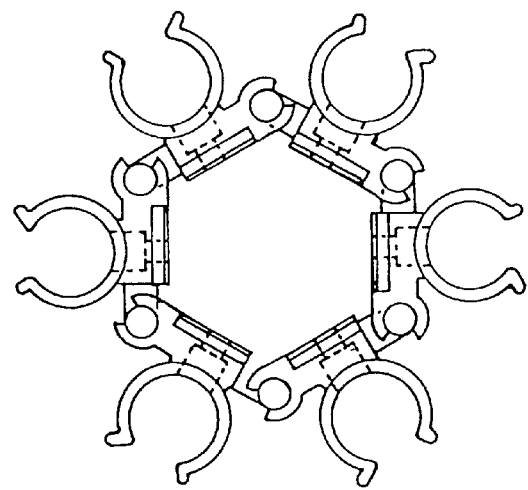
Figure 4A:
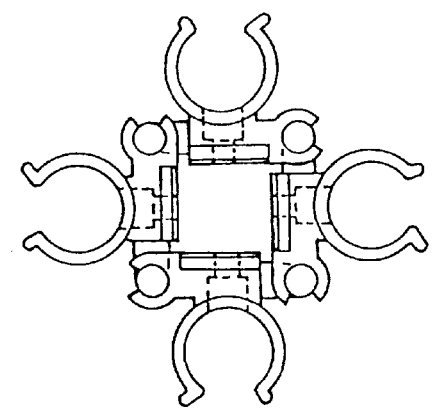
Figure 4F:
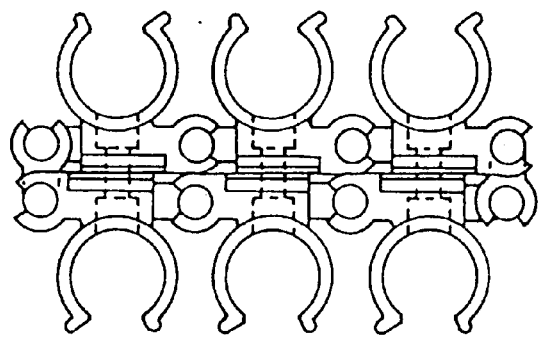
Figure 4E:
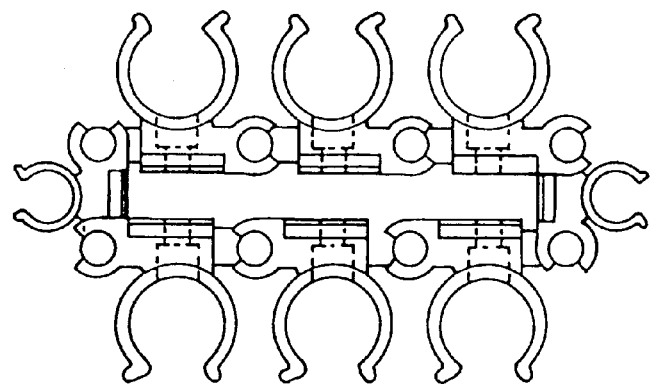
Figure 4D:
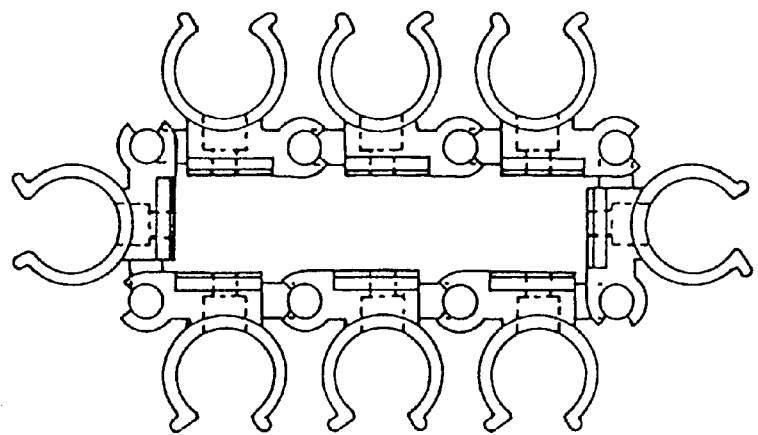
Figure 5:
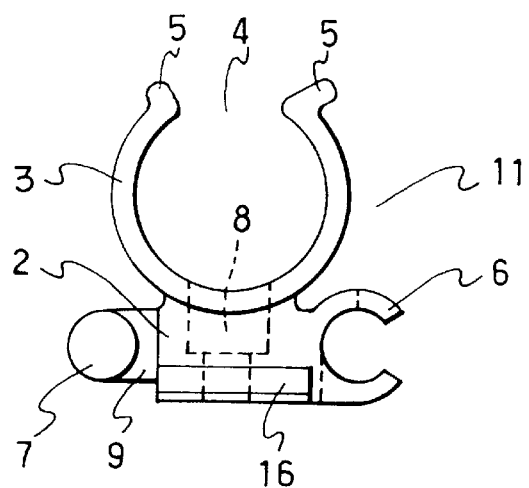
FIG. 5 is a front view of a second embodiment of the hose holder of the present invention.
Figure 6:
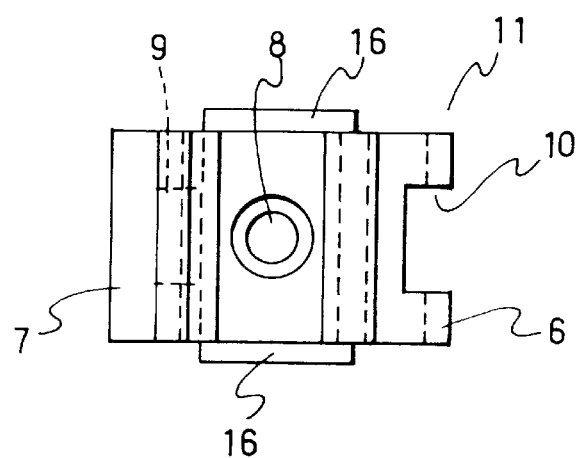
FIG. 6 is a plan view of the hose holder of the present invent shown in FIG. 5.
Figure 9:
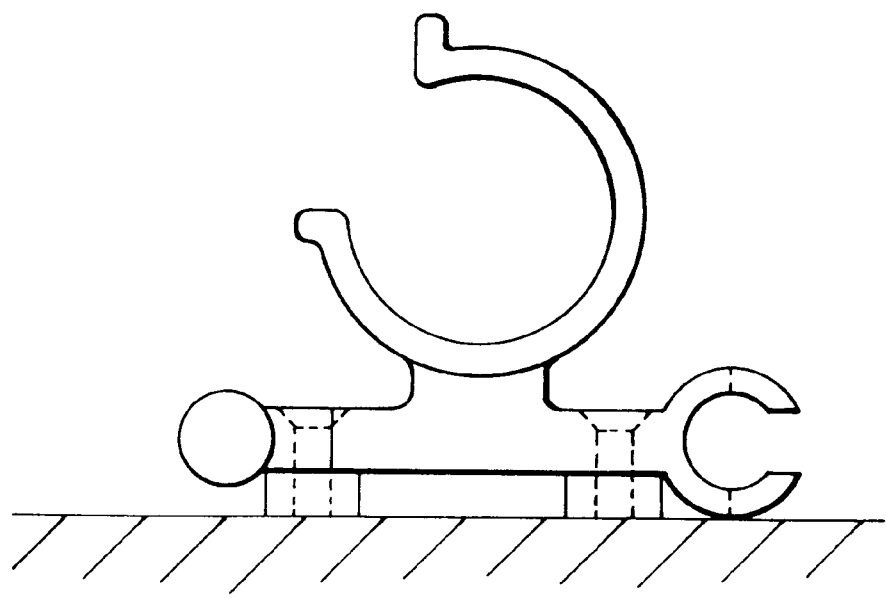
FIG. 9 is a front view of a third embodiment of the hose holder of the present invention, illustrating the mounting holes provided in the base portion of the hose holder.

FIG. 1 shows a plastic holder 1 (hereinafter referred to as the hose holder) for detachably holding a hose 9 (shown in phantom lines in FIG. 3). The hose holder 1 is provided with a base portion 2 and a hose holding portion 3 integrally formed with the base portion 2. As shown in FIG. 1, the hose holding portion 3 of the hose holder 1 is formed in cross-section into a substantially C-clip shape having an upwardly oriented opening 4. As shown in FIG. 9, it is also possible for the hose holder 1 to have its opening 4 upwardly and outwardly oriented. The hose holding portion 3 of the hose holder 1 has a pair of opposite free ends which extend or flare outwardly to form a pair of guide extensions 5. These guide extensions 5 function to guide the hose 9 into the hose holding portion 3 of the hose holder 1. The hose holding portion 3 substantially corresponds in diameter to the hose 9. Consequently, it is preferable to provide a plurality of the hose holders 1, which vary in diameter of their hose holding portions 3 to hold different-size or -diameter hoses 9 therein, as shown in FIG. 3. In case that the hose holder 1 is made of resilient materials such as resilient plastics and the like, since its hose holding portion 3 is resiliently deformed, it is possible for such resilient hose holder 1 to hold the different-diameter hoses 9, provided that theses hoses 9 vary in diameter within limits.

The base portion 2 of the hose holder 1 has one of its opposite ends formed into a substantially C-clip shaped socket means, i.e., socket portion 6 having a horizontally oriented opening; and, the other of the opposite ends of the base portion 2 formed into a plug means, i.e., plug portion 7 which is so designed as to be detachably and rotatably mounted in the socket portion 6 of an adjacent one of the hose holders 3 in an insertion manner in a hose holder system of the present invention, the system being constructed of a plurality of the hose holders 1. As is clear from FIG. 3, in the hose holder system of the present invention, since it is necessary to have the different-size hose holders 1 detachably connected with each other, both the socket portions 6 and the plug portions 7 of such different-size hose holders 1 are so formed as to have the substantially same diameter. In assembly of the hose holder system of the present invention, the plug portion 7 of one of the hose holders 1 is inserted into the socket portion 6 of an adjacent one of the hose holders 1 from the side thereof. However, it is also possible to insert the plug portion 7 into the socket portion 6 from the right, as viewed in FIG. 1, provided that the hose holder 1 is made of resilient materials such as resilient plastics and the like.

Figure 2:
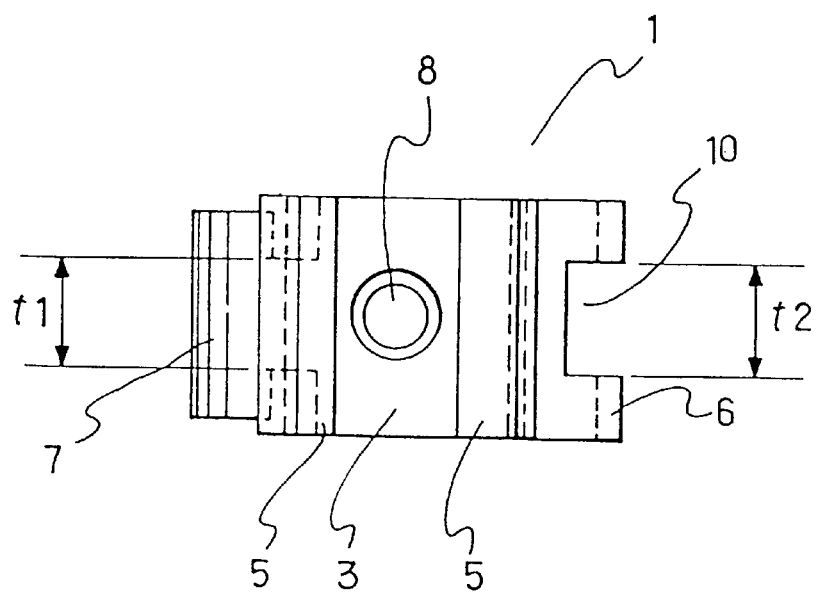
FIG. 2 is a plan view of the hose holder of the present invention shown in FIG. 1.

As shown in FIG. 2, it is not necessary for the socket portion 6 of the hose holder 1 to extend over the entire width of the base portion 2. In other words, the socket portion 6 may cut off its intermediate portion 10, as shown in FIG. 2. A width t2 of such cut-off intermediate portion 10 of the socket portion 6 is slightly larger than a width t1 of the a neck portion 9 of the plug portion 7, which permits the neck portion 9 of the hose holder 1 to enter the cut-off intermediate portion 10 of the adjacent one of the hose holders 1 when the plug portion 7 of the hose holder 1 is rotated relative to the socket portion 6 of such adjacent one of the hose holders 1 in a condition in which the hose holder 1 has been connected with the adjacent one of the hose holders 1 in the hose holder system of the present invention. Incidentally, there is a fear that the plug portion 7 of the hose holder 1 drops sideward out of the socket portion 6 of the adjacent one of the hose holders 1 in the system due to vibration caused by instruments in operation. Consequently, in order to remove such fear, each of the socket portion 6 and the plug portion 7 is so designed as to have a sufficient width for preventing the plug portion 7 of the hose holder 1 from dropping sideward out of the socket portion 6 of the adjacent one of the hose holders 1. If necessary, a mounting hole 8 is formed in the hose holder 1 so as to pass through an inner bottom surface of the hose holding portion 8 and the base portion 2. Incidentally, in FIG. 9, the mounting hole 8 is formed in each of opposite end portions of the base portion of the hose holder. When the hose holder 1 is provided with the mounting hole 8, it is possible to fixedly mount the hose holder 1 on the frames of the instruments, wall surface and the floor by means of screws, bolts and like fastening means.

In the hose holder system of the present invention, a desired number of the hose holders 1 are detachably connected with each other by detachably connecting each of their plug portions 7 with the socket portion 6 of an adjacent one of the hose holders 1. As shown in FIG. 3, depending upon application, it is also possible to detachably connect a plurality of different-size hose holders 1 with each other, which holders 1 very in diameter of their hose holding portions 3. The hose holders 1 thus connected with each other form one of desired constructions of the hose holder systems of the present invention. This hose holder system is disposed in a position in which the hoses 9 tend to be brought into contact with each other, and fixedly mounted therein, if necessary. Thereafter, the hoses 9 are detachably inserted into the hose holder portions 3 of the system from the openings 4 thereof, so that the hoses 9 are spaced apart from each other in neat, orderly arrangements to prevent them from interfering with each other.

FIGS. 4(A), 4(B), 4(C), 4(D), 4(E) and 4(F) show various constructions of the hose holder system of the present invention, in which a plurality of the hose holders 1 are detachably connected with each other to form various types of annular constructions. In each of such annular constructions: the plug portion 7 of the hose holder 1 is detachably and rotatably mounted in the socket portion 6 of an adjacent one of the hose holders 1 in an insertion manner; and, the width t1 of the neck portion 9 of the plug portion 7 of the hose holder 1 is smaller than the width t2 of the cut-off intermediate portion 10 of the socket portion 6 of the adjacent one of the hose holders 1. Of the annular constructions: ones shown in FIGS. 4(A), 4(B) and 4(C) enable the hose holder system of the present invention to encircle tubular objects, rod-like objects, rod-like frames and the like; and, ones shown in FIGS. 4(D) and 4(E) enable the hose holder system of the present invention to encircle plate-like frames and the like.

Figure 7:
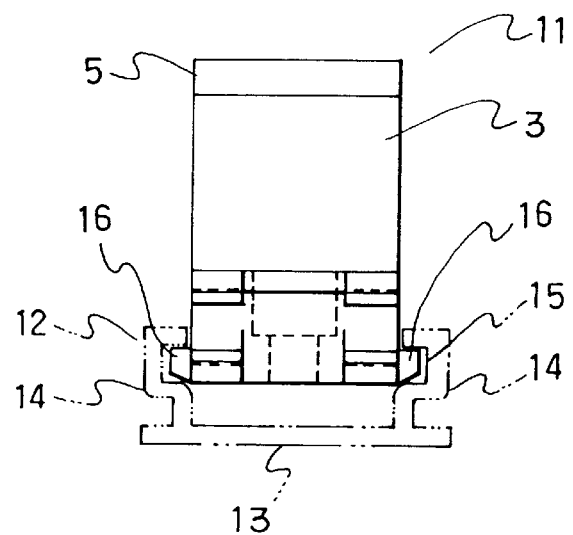
FIG. 7 is a side view of the hose holder of the present invention shown in FIG. 5 in a condition in which the hose holder engages with its support rail.

FIGS. 5 to 8 show a hose holder 11 of a second embodiment of the present invention. The hose holder 11 is fixedly mounted on the instruments, wall surfaces, floor and the like through its support rail 12. As shown in FIG. 7, the support rail 12 is constructed of: a bottom plate 13 fixedly mounted on the instruments and the like; and, a pair of support walls 14 extending upward from opposite sides of the bottom plate 13. Each of the support walls 14 is provided with a longitudinal inner support grooves 15.

Figure 8:
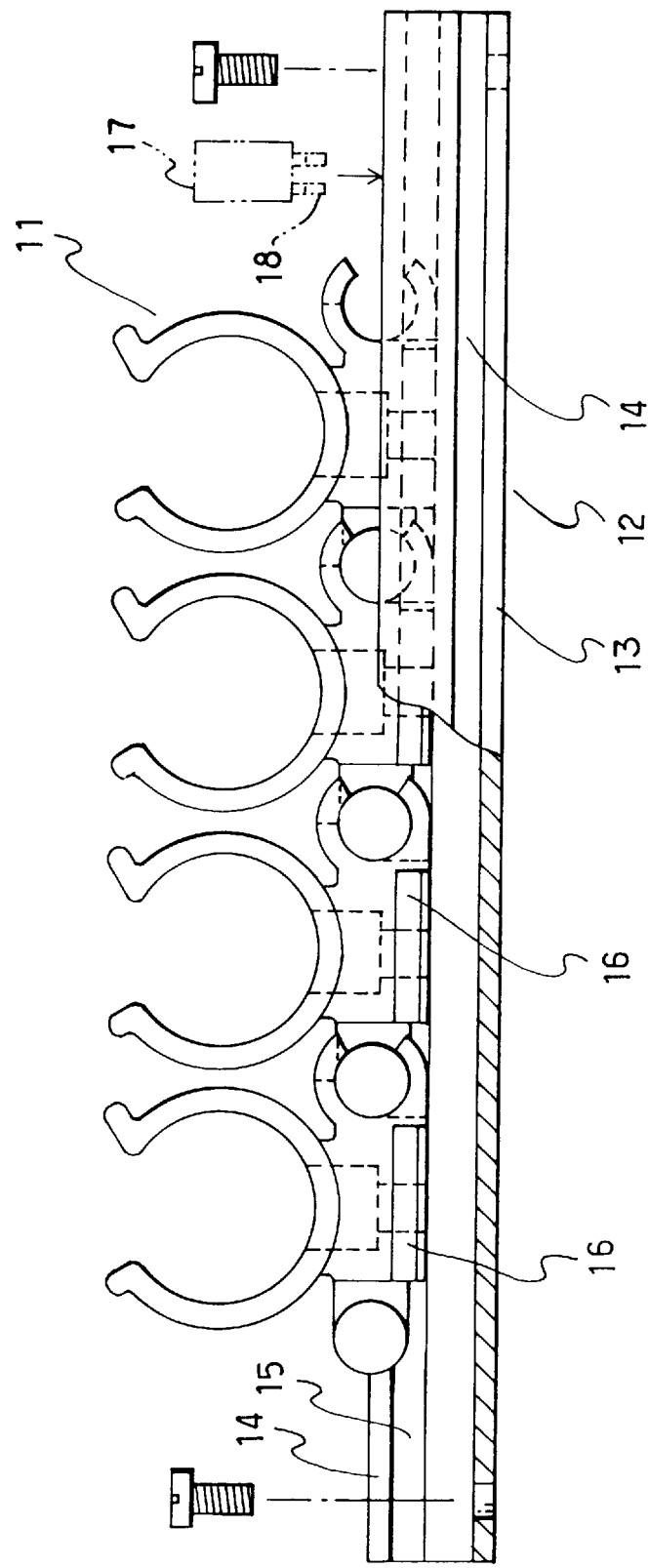
FIG. 8 is a side view of the hose holder system constructed of a plurality of the hose holders of the second embodiment of the present invention shown in FIG. 5 in a condition in which these hose holder are detachably connected with each other while supported by the same support rail.

On the other hand, the hose holder 11 has the same construction as that of the hose holder 1, except that the hose holder 11 is provided with a pair of horizontal projections 16 in opposite sides of the hose holding portion 2, as viewed in FIG. 7. These projections 16 of the hose holder 11 are slidably inserted into a pair of support grooves 15 of the support rail 12 from the end of the rails 12, so that a plurality of the hose holders 11 are supported by the same support rail 12, as shown in FIG. 8.

Preferably, a stopper 17 is fixedly mounted in the support rail 12 so as to prevent the hose holders 11 from slidably moving along the support rail 12. The stopper 17 is provided with a pair of leg portions 18 which engage with the support grooves 15 of the support rail 12 in the substantially same manner as that of the projections 16 of the hose holder 11. Namely, the leg portions 18 of the stopper 17 are slidably inserted into the support grooves 15 of the support rail 12 from the end of the rail 12 and fixedly mounted therein.

The foregoing description of the specific embodiments will so fully reveal the general nature of the present invention that those skilled in the art can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A hose holder system comprising at least one hose holder provided with a base portion and a hose holding portion for holding a hose therein,
    characterized in that:
        said hose holding portion is integrally formed with said base portion and provided with an opening for receiving said hose therein; and
        said base portion has one of its opposite end portions formed into a socket and another of said opposite end portions formed into a plug sized to be fitted in said socket; wherein
            said hose holder system comprises at least a pair of said hose holders;
            said plug of said hose holder is provided with a neck portion through which said plug is integrally connected with said base portion;
            said socket is provided with a cut-off intermediate portion which is larger in width than said neck portion; and
            said plug of one of said hose holders is rotatably mounted in said socket of the other of said hose holders.

2. The hose holder system, as set forth in claim 1, wherein:
    said hose holders are different in diameter of said hose holding portion from each other, while connected with each other.

3. The hose holder system, as set forth in claim 2, wherein:
    said hose holders are linearly connected with each other.

4. The hose holder system, as set forth in claim 2, wherein:
    said hose holders are connected with each other to form an annular construction of the hose holder system.

5. The hose holder system, as set forth in claim 2, wherein:
    said hose holder is provided with a through-hole passing through an inner wall surface of said hose holding portion and said base portion, said through-hole serving as a mounting hole of said hose holder.

6. The hose holder system, as set forth in claim 2, wherein:
    said hose holder is provided with a pair of projections in opposite sides of said base portion; and
    said projections engage with a support rail fixed to instruments, wall surfaces and like supports.

7. The hose holder system, as set forth in claim 1, wherein:
    said hose holders are linearly connected with each other.

8. The hose holder system, as set forth in claim 7, wherein:
    said hose holder is provided with a through-hole passing through an inner wall surface of said hose holding portion and said base portion, said through-hole serving as a mounting hole of said hose holder.

9. The hose holder system, as set forth in claim 7, wherein:
    said hose holder is provided with a pair of projections in opposite sides of said base portion; and
    said projections engage with a support rail fixed to instruments, wall surfaces and like supports.

10. The hose holder system, as set forth in claim 1, wherein:
    said hose holders are connected with each other to form an annular construction of the hose holder system.

11. The hose holder system, as set forth in claim 10, wherein:
    said hose holder is provided with a through-hole passing through an inner wall surface of said hose holding portion and said base portion, said through-hole serving as a mounting hole of said hose holder.

12. The hose holder system, as set forth in claim 10, wherein:
    said hose holder is provided with a pair of projections in opposite sides of said base portion; and
    said projections engage with a support rail fixed to instruments, wall surfaces and like supports.

13. The hose holder system, as set forth in claim 1, wherein:
    said hose holder is provided with a through-hole passing through an inner wall surface of said hose holding portion and said base portion, said through-hole serving as a mounting hole of said hose holder.

14. The hose holder system, as set forth in claim 13, wherein:
    said hose holder is provided with a pair of projections in opposite sides of said base portion; and
    said projections engage with a support rail fixed to instruments, wall surfaces and like supports.

15. The hose holder system, as set forth in claim 1, wherein:
    said hose holder is provided with a pair of projections in opposite sides of said base portion; and
    said projections engage with a support rail fixed to instruments, wall surfaces and like supports.

16. The hose holder system, as set forth in claim 1, wherein:
    said hose holder is provided with a through-hole passing through an inner wall surface of said hose holding portion and said base portion, said through-hole serving as a mounting hole of said hose holder.

17. The hose holder system, as set forth in claim 1, wherein:
    said hose holder is provided with a pair of projections in opposite sides of said base portion; and
    said projections engage with a support rail fixed to instruments, wall surfaces and like supports.

* * * * *